United States Patent
Alexander et al.

[15] 3,693,265
[45] Sept. 26, 1972

[54] PILOT ARMREACH AND COCKPIT CONTROL LOCATOR MACHINE

[72] Inventors: Milton Alexander, Fairborn; John W. Garrett, Bellbrook; Ralph R. Riepenhoff, Dayton, all of Ohio

[73] Assignee: The United States of America as represented by the Secretary of the United States Air Force

[22] Filed: July 7, 1971

[21] Appl. No.: 161,361

[52] U.S. Cl. ...............................35/12 F, 33/174 D
[51] Int. Cl. ................................................G09b 9/08
[58] Field of Search .........35/12 R, 12 C, 12 D, 12 F, 35/12 H, 12 P, 12 W, 22 R, 29 R, 11; 33/174 D; 73/379 R, 432 AD; 272/57 A; 128/25 R, 26

[56] References Cited

UNITED STATES PATENTS

| 1,865,828 | 7/1932 | Buckley | 35/12 P |
| 2,341,678 | 2/1944 | Wickes | 35/12 D |

*Primary Examiner*—Wm. H. Grieb
*Attorney*—Harry A. Herbert, Jr. et al.

[57] ABSTRACT

Test apparatus for determining the capability of a pilot, while suited, helmeted and restrained in an aircraft cockpit seat, to reach, grasp and manipulate a control knob located at various angular distances and knob heights above floor level. The apparatus consists basically in a seat and support therefor, a deck simulating the floor of the aircraft cockpit, and a knob-mounted vertical member having a series of vertically-aligned knobs located at preselected heights, and being quickly adjusted to preselected angular positions.

9 Claims, 6 Drawing Figures

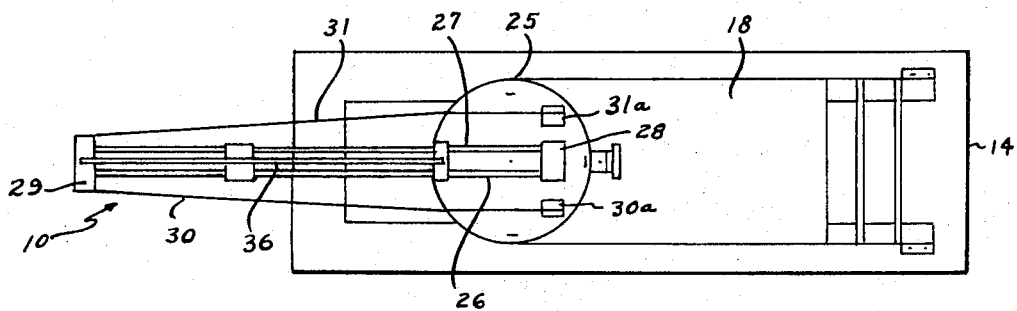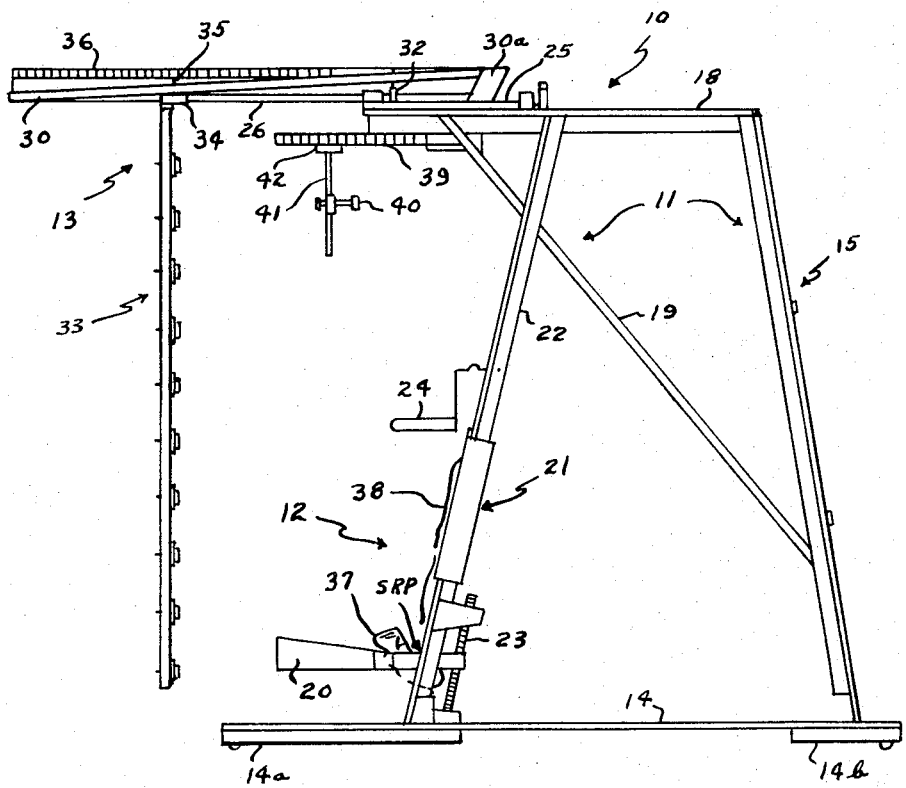

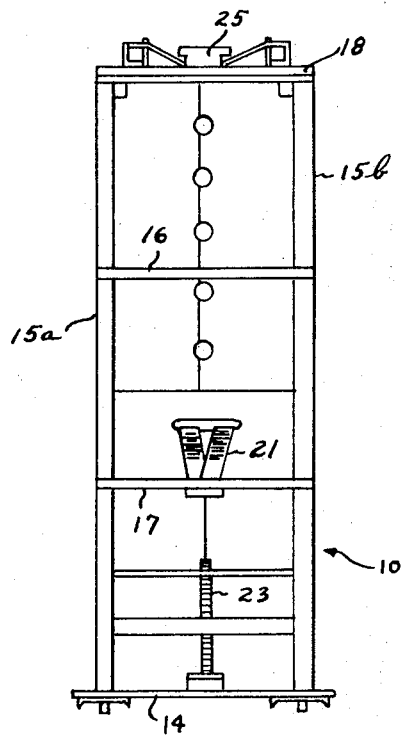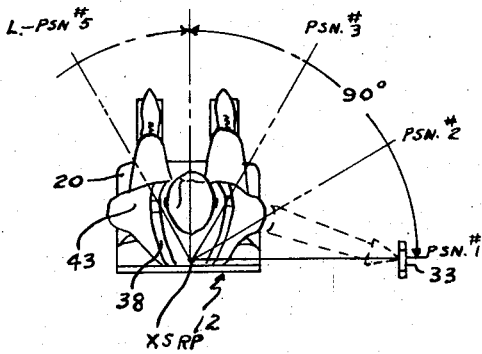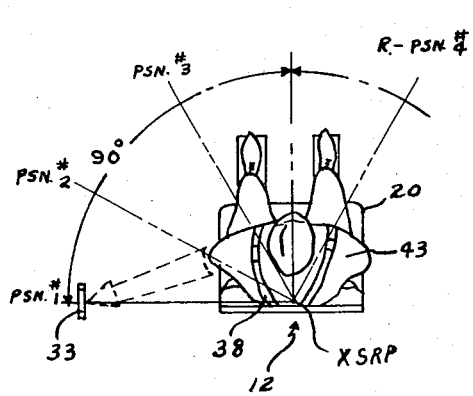

PILOT ARMREACH AND COCKPIT CONTROL LOCATOR MACHINE

BACKGROUND OF THE INVENTION

This invention relates to an improved method and test apparatus for measuring the ability of a pilot, while strapped in an aircraft cockpit seat, to reach, grasp and satisfactorily operate various control knobs located on the instrument panel and at different positions within the cockpit.

Many anthropological studies have been made to determine the facility with which man has been able to reach, grasp and actuate various controls. Such studies have proven useful generally in the design of aircraft cockpits and, in particular, for the location of various instruments, engine and aerodynamic controls. In this connection, however, there has been a dearth of published data involving the actual arm reach capability particularly on a satisfactory sample of personnel wearing and therefore being hampered by flight equipment in actual cockpit situations. This lack of such information presents considerable difficulty to the aircraft designer who must add or substract selected increments from a minimum of available data in order to accommodate a suited, helmeted, harnessed and restricted pilot. Personal equipment adds still further to the design problem.

In addition to the above-mentioned difficulties, the design problem is further made more complex as aircraft have grown much more complicated to further increase the bulk of the personal equipment to be more worn by the pilot. Thus, as the hostile world of high G forces was entered, initially, the G-suit and oxygen mask era ensued which, in turn, was followed by the current potential requirement for the "full-pressure suit piloted" aircraft systems. The use of such a full-pressure suit, obviously, greatly increases the gross area occupied by the wearer and also considerably reduces shoulder mobility and hand dexterity.

Adding still further to the difficulties outlined above, is the fact that the pilot does not sit freely in the cockpit, but, in addition to being encumbered by his clothing, is placed under the additional restraint of the requirement of wearing a seat belt, a shoulder harness, a parachute harness and, for all flights over water, an underarm life preserver. Naturally, these items must be considered when collecting or applying arm reach data to cockpit design.

The aforementioned arm reach data has now been obtained in a very reliable and yet unique and simplified manner by the use of the improved arm reach test apparatus and method of the present invention, which apparatus will be hereinafter disclosed in the following summary and detailed description thereof.

BRIEF SUMMARY OF THE INVENTION

The present invention consists briefly in a novel pilot armreach capability-measuring apparatus including a main support frame having a deck plate representing the floor of a cockpit, an adjustably positioned seat, an overhead, horizontal member, and a knob-mounted member rotatably and slidably positioned on the overhead member for adjustment to various distances and angles from a test subject positioned in the seat. The knob-mounted member incorporates a series of rotating knobs in vertical disposition thereon and at preselected heights above the deck plate.

Additional advantages, as well as certain objects of the invention will become readily apparent from the following disclosure thereof, taken in connection with the accompanying drawings; in which;

BRIEF DESCRIPTION OF THE DRAWINGS

FIGS. 1, 2 and 3 respectively represent top, side and back views of the improved armreach test apparatus of the present invention;

FIG. 4 is a partly schematic and relatively enlarged view of the unique control knob-mounted member of the test apparatus of FIGS. 1-3;

FIG. 5 is another, partly schematic and composite plan view, illustrative of a test subject, attired in lightweight flight coveralls with accessary equipment and shoulder harness unlocked, and while seated in the inventive test apparatus of FIGS. 1-3, shown reaching with his right hand to grasp and manipulate the lowermost rotary knob mounted on the knob-mounted member of FIG. 4, which member is further schematically depicted as being located at various right-arm angular positions relative to the center line or 0° position; and FIG. 5a is still another, partly schematic and composite plan view, as in FIG. 5, illustrating the test subject thereof reaching with his left hand to grasp and manipulate the lowermost rotary knob positioned on the inventive knob-mounted member, the latter again being further depicted in various angular positions relative to the center line or 0° position.

DESCRIPTION OF THE PREFERRED EMBODIMENT

Referring to FIGS. 1 to 3 of the drawings, it is clearly seen that the novel test apparatus of the present invention, indicated generally at the reference numeral 10, consists principally of three main parts; namely, the supporting frame assembly at 11, the seat assembly at 12, and the pilot arm reach capability-measuring assembly, indicated generally at 13. The supporting frame assembly 11 includes a base member portion or deck plate 14 that may represent the floor of an aircraft cockpit, a main, substantially upright supporting frame portion, indicated generally at 15, and consisting of a pair of parallel and spaced-apart, identical supporting frame members 15a and 15b (See FIG. 3) reinforced by cross-braces at 16 and 17, and a horizontally disposed overhead member-portion, indicated at 18, that is affixed at one end thereof to, and is thereby rigidly supported by, the upper ends of the supporting frame members 15a, 15b. A pair of supporting beams, one of which is depicted at 19 in FIG. 2, may be utilized, as shown, between the frame members 15a and 15b, and the overhead member-portion 18 to provide reinforcement to the latter element.

The aforementioned seat assembly 12 consists mainly of a seat pan 20 and a back rest 21 that may be adjustably supported on a pair of spaced-apart and parallel seat rails, one of which being depicted at 22 in FIG. 2, which seat rails, and therefore the back rest 21, extend upwardly at a 13° angle to the rear of the vertical, and between the deck plate 14 and the horizontal overhead member-portion 18. The aft 5.75 inches of the seat pan 20 is made horizontal and the forward section thereof is inclined upwardly at a 12.5° angle. In this regard, for the purpose of achieving the same standards in testing a number of representative subjects while using the inventive test apparatus 10, a seat reference point (SRP), located at the intersection between the seat pan portion 20 and the seat back portion 21 is utilized. This seat reference point is set at a nominal or neutral point of 8.5 inches above the deck plate 14. However, the seat pan 20 and therefore the SRP is made adjustable in height above the said deck plate 14 for a total range of 5 inches or, in other words, from about 6-11 inches. For this purpose, the seat-adjustment means, indicated in partially schematic form at 23, may be utilized. This adjustable feature of the seat assembly 12 is specifically provided to thereby set the eye level of each test subject at a common 39.5 inches above the deck plate 14, again, to ensure standardized test conditions. To this end, a seated, eye-height adjustment lever is provided, as shown at 24 in FIG. 2. The eye-height adjustment lever 24 is fixed at the aforementioned standard 39.5 inches above the deck plate 14 and, for each test subject, the seat assembly 12 is adjustable an appropriate distance upwardly or downwardly from the neutral 8.5 inch point, by means of the adjustment means at 23, until his eye level is directly aligned with the lever 24. As referred hereinbefore, this adjustment may extend up to 2.5 inches up or down from the neutral 8.5 inch point. The said adjustment lever 24 may be swingably or pivotally mounted, for example, by common hinge or other means (not shown) to the left supporting frame member 15a (FIG. 3), for example, for positioning between the outer, eye-height-testing position of FIG. 2 and a retracted, out-of-the-way position, as desired. A simple scale (not shown) may be provided on one or the other seat-rail members, as at 22, or both, if desired, to indicate the exact vertical position required on each test subject to achieve the 39.5 inch eye height for future reference. Of course, as the eye height of each subject is adjusted to the aforesaid 39.5 inches, the required upward or downward movement of the seat assembly 12 on the seat rails 22 to achieve this result will naturally move the seat and seat reference point (SRP) backward or forward relative to the position of the principal or main knob-mounted, vertical member 33 of the previously referred to unique pilot arm reach capability-measuring assembly 13 to be hereinafter described in detail. To compensate for this difference in the initial, inherent arm reach distance formed between the aforesaid knob-mounted member 33 and different test subjects, resulting from the preliminary requirement to adjust each to an eye level height of 39.5 inches above the deck plate 14, it is only necessary to adjust the position of the said knob-mounted member 33, relative to its scale, an amount forward or rearward equal to the forward or rearward movement of the seat reference point. The exact amount of the latter movement may be easily and automatically determined by the provision of an appropriate scale (not shown) formed on one or the other of the seat rails, as at 22, as desired.

The unique pilot arm reach capability-measuring assembly 13 of the present invention preferably consists of a turn-table 25 that may be mounted, as seen in FIGS. 1 and 2, to the top surface of the horizontal, overhead member-portion 18 adjacent the outer edge thereof. Rigidly affixed, as by the first attachment means at 28 (FIG. 1), may be respective inner ends of a pair of identical, horizontal and parallel rail members at 26 and 27. The latter elements 26, 27 terminate at outer ends that may be interconnected by a second attachment means at 29. A pair of supporting brace members at 30 and 31 may also be rigidly attached at the inner ends thereof to the turn-table 25 by the attachment means at 30a and 31a, which may actually constitute upright supports, as seen at 30a in FIG. 2, for the said inner ends of said brace members 30 and 31. The latter elements 30, 31 substantially converge to, and terminate in, outer ends that may be rigidly attached to the previously referred to second attachment means 29 that also provides the attachment for the outer ends of the horizontal rail members 26 and 27, as has been previously explained. Said brace members 30 and 31 may each be further bearing supported, as seen for example, at the bearing support means 32 for the member 30 in FIG. 2, for thereby providing very rigid and strong support to the rail members 26, 27.

Adjustably, or slidably, positioned on the above-described pair of horizontal rail members 30 and 31 is the unique and previously mentioned, vertical knob-mounted member, indicated generally at 33. For this purpose, the member 33 may be affixed at its upper end to, or within, a hollow-type, interconnecting, element at 34, the opening of which element 34 being constructed with a suitable configuration so as to be preferably slidably mounted in substantially snug-fit and positive-supporting relation on the aforementioned pair of rail members 26 and 27, as is clearly visible in FIG. 1, for example. To the mid-point of the said slidably-mounted, interconnecting element 34 and in direct alignment with, and forming a natural vertical extension of, the longitudinal axis of the knob-mounted member 33 is a pointer or scale-indicator marker at 35, which market 35 indicates, on the main, arm reach-determining or measuring scaled elements at 36, the exact distances at which a particular test subject, seated in the seat assembly 12 and strapped therein by both lap belt at 37 and shoulder straps at 38 (FIG. 2), is able to reach, grasp and manipulate various control knobs at various preselected angular positions, in the specific manner to be hereinafter further described in connection with FIGS. 4, 5 and 5a.

Again referring to FIG. 2, another important feature of the present test apparatus resides in the provision of an overhead reach scale at 39, which scale 39 is mounted, as shown, to the bottom of the overhead member-portion 18 to extend horizontally, and in overlapping and outward relation therefrom. An auxiliary, secondary or supplementary pilot arm reach-measuring, rotary knob at 40 may be adjustably mounted on the relatively short vertical and depending standard member 41. With the use of the aforesaid rotary knob 40, the ability of each of the several test subjects employed in the application of the present test apparatus 10 to reach, grasp and actuate controls that may be installed in the aircraft cockpit directly or substantially directly overhead may be quickly determined and recorded. To this end, the rotary knob 40 may be utilized as a continuation of tests run on the main, or primary, knob-mounted member 33 when the latter has been adjusted the maximum extent inwardly towards the subject to a position where it contacts, and is stopped by, the seat pan 20 (FIG. 2). To provide for the measurement of the overhead arm reach-capability, of the said test subjects, the auxiliary knob-mounted, standard member 41 may incorporate in its surface a total of three notches for respective engagement with, and thereby providing three positions of vertical adjustment to the rotary knob 40. Of course, horizontal adjustment of the member 40 may be provided by the means at 42 which is slidably positioned on the scale 39. These three positions of adjustment are at the same heights as are the top three control knobs 7, 8 and 9 on the knob-mounted member 33.

The aforementioned main or primary knob-mounted member 33 is shown in more detail in the schematic view of FIG. 4, as incorporating a plurality of rotary knobs respectively indicated at the reference numerals 1-9, inclusive, which knobs simulate controls that may be positioned on an aircraft instrument panel, or otherwise placed by the design engineer in the aircraft cockpit area for actuation by the pilot. The control knobs 1-9 may be vertically disposed relative to each other, at the varying heights indicated in the figure, beginning with the lowermost control knob No. 1, at a height of 6 inches, to the uppermost control knob No. 9 at a height of 63 inches. These heights are measured above the previously described deck plate 14 (FIG. 2).

In applying the inventive test apparatus 10 to determine the proper location of various instrument and aircraft controls to be placed in the cockpit of an aircraft of a particular design, the arm reach capabilities of a total of 17 subjects, all volunteer Air Force personnel, were tested and the data resulting therefrom recorded for future use by the aircraft design engineer. These 17 test subjects were so selected as to be as nearly representative as possible of pilots of various sizes in the U.S. Air Force. For this purpose, the Anthropology Branch of the Air Force's Aerospace Medical Laboratory previously compiled two separate tables comprising a standard 12-size height-weight chart for use when the standard Air Force K2B lightweight flight coveralls are to be worn, and a standard eight-size height-weight chart to be utilized when the full-pressure suit is to be worn. The 12-size height-weight chart incorporates individuals varying from the small-short size of between 63-65.9 inches in height and 125-149 pounds, to the extra large-long size of between 73.5-76.5 inches in height and 200-224 pounds. The eight-size height-weight chart is directed to individuals varying from the small-regular size of between 63.0-67.5 inches in height and 125-149 pounds, to the extra large-long size of a height between 72.0-76.5 inches and a weight of 200-224 pounds.

Before summarizing representative examples of the test results obtained with use of the present test apparatus 10, it is well to note that the smallest man does not necessarily have the shortest arm reach, nor, conversely, does the largest man necessarily have the greatest arm reach. In fact, of the first 15 knob positions for which design criteria was found and recorded, the minimum reach was accomplished by one of the smaller subjects only four times and the maximum value was obtained by one of the biggest subjects only three times. Various reasons for this anomaly include, among others, relative ease of joint mobility, degree of muscular development, and relative amount of fat deposition. Therefore, the design criteria determined during the present tests have not been based on the reaching capabilities of the smallest man but, instead, have been based on the shortest arm reach capability within the population of test subjects. Thus, the actual design values found and selected, would be the minimum values recorded within the entire sample, rounded off to the nearest inch. In this regard, where two or more subjects failed to reach, grasp and actuate a particular control knob, the placement of any control at that location would not be recommended.

The test apparatus 10 has been utilized to test the arm reach capabilities of the previously-mentioned preselected 17 subjects in a series of substantially identical tests, during which each of the subjects selected was alternately clothed in lightweight flight coveralls, and the full-pressure suit, in addition to wearing certain accessary equipment. In an initial series of tests involving the wearing of the aforesaid lightweight flight coveralls, each test subject, such as that indicated at 43 in FIGS. 5 and 5a, is strapped in the seat assembly 12 of the inventive test apparatus 10, after having donned a pair of light flying gloves, an underarm life preserver, and a back-type parachute harness. The subject's horizontal line of vision is then adjusted to a height of 39.5 inches above the deck plate 14 and, in this initial series of tests, his shoulder harness 38 is placed in its unlocked condition, allowing up to 12 inches of relatively free travel at the discretion of the wearer. Thereafter, the test subject 43 attempts to reach, grasp and actuate the previously referred to control knobs 1-9, inclusive, in the following sequence of reach procedure, established for the purpose of the present tests. Initially, the right arm and hand are used in an effort to reach, grasp and actuate the aforementioned control knobs 1-9, with the knob-mounted member 33 being successively rotated to each of five different locations, schematically depicted in FIG. 5 as position Nos. 1, 2, 3, 4 and 5. The latter positions are respectively at 90°, 60°, and 30° to the right of center, or 0° position No. 4, and at 30° to the left of center, the latter position constituting the right-arm cross-over position. To successfully actuate each control knob, it has been established that the latter must be turned through at least a 90° arc. Of course, the novel and yet simplified apparatus 10 of the present invention greatly facilitates the rest procedure, since the knob-mounted member 33 is quite easily rotated to the various preselected angular positions of 90°, 60°, 30° and 0° merely by the manual manipulation of the turn-table 25 (FIG. 1) to which turn-table the said knob-mounted member 33 is mounted, as was previously explained in connection with FIGS. 1-3.

The subject 43 continues the foregoing tests by further trying to reach, grasp and actuate, with his left arm and hand as seen in FIG. 5a, the same nine control knobs in each of four angular positions of adjustment of the knob-mounted member 33, which positions are again indicated respectively as being position Nos. 1, 2, 3 and 4. The first three left-arm positions are, as in the case of the right-arm, respectively oriented at 90°, 60° and 34° to the left of center. The fourth, left-arm position, which is the cross-over position is at a 30° angle to the right of center. It is noted that, whereas five positions were utilized for the right-arm, only four positions were tested with the left arm, since the center or 0° position (position No. 4 in FIG. 5) may be utilized for either the right or left arm. In this instance, the right arm was chosen for the purpose of this series of tests.

The same sequence of test procedure outlined above may then be continued on each of the 17 subjects, again with the lightweight flight coveralls being worn, but, this time with the shoulder harness in its locked condition. Finally, identical tests were conducted with each subject wearing a full-pressure suit worn both while uninflated and inflated and, once more, with the shoulder harness in both unlocked and locked conditions. In the first series of tests, with the subject wearing the lightweight flight coveralls and with his shoulder harness unlocked, at least 16 out of the 17 subjects successfully manipulated and, therefore, a design criteria was established for each of the right-arm positions Nos. 1, 2, 3, 4 and 5, and for all nine rotary knobs in each of these positions, except for control knob 9, the uppermost knob, when the knob-mounted member 33 was rotated to position Nos. 1, 2, 3 and 4. In position No. 5, all except control knobs 8 and 9 were successfully operated and a design criteria established therefor. A representative example of the type of design criteria found during the first series of tests, and which offers extremely valuable data to the design engineer, is as follows:

"To manipulate with the RIGHT hand a rotary knob located 90° to the right of center and 6" above the deck the knob must be placed no further than 34" from the XSRP."

For the left arm positions tested, a favorable design criteria was determined for all of position Nos. 1, 2, 3 and 4, except for control knobs 8 and 9 at positions Nos. 1, 3 and 4; control knob 9 at position No. 4; and, finally, control knobs 6 and 7 at position No. 4 (See FIG. 5a). As noted hereinbefore, no design criteria is recommended for the positioning of any controls at any position where at least two of the 17 subjects tested failed to reach, grasp and manipulate the pertinent control knob involved.

A final series of tests involving the present test apparatus 10 was concerned with each of the subjects under test wearing the full-pressure suit, as noted hereinbefore, that included the helmet, full-pressure gloves and accessary equipment, again, consisting of an underarm life preserver, and a back-type parachute harness. This series of tests were run with, initially, the full-pressure suit uninflated and the shoulder harness unlocked. Thereafter, several other series of tests were conducted with the shoulder harness locked and then with the full-pressure suit inflated to a pressure of 3.5 psig, both with the shoulder harness unlocked and locked. The same sequence of reach procedure was followed, as described hereinbefore. As might be expected, the arm reach capabilities with wearing of the more cumbersome full-pressure suit produced a design criteria that was somewhat reduced over that of the subject wearing the lightweight flight coveralls. For example, while in the position No. 1 of FIG. 5, a design criteria was established which permitted the placement of a control, at a height above the deck of 6 inches, a distance from the XSRP of no further than 34 inches, for a pilot wearing lightweight flight coveralls. In the same equivalent position No. 1, while wearing the full-pressure suit, uninflated and with shoulder harness unlocked, this distance was reduced to 28 inches. This difference in the arm reach capabilities between the relatively unencumbered, lightweight flight coveralls and the relatively bulky, full-pressure suit is particularly emphasized at both the lower and upper positioned control knobs and becomes less noticeable at the middle-positioned control knobs. On the other hand, with the full-pressure suit inflated, the considerable additional restrictive movement inherent therein becomes fairly noticeable from the test results showing for example, that 12 out of 17 subjects failed to reach, grasp and actuate control knob 1, which, as previously noted, is the lowermost knob at a 6 inch height above the deck plate 14, while the said knob was rotated to a 90° angle to the right of center. This condition prevailed, whether or not the shoulder harness was locked or unlocked, and, of course, no design criteria could be recommended therefor. A similar situation existed for every control knob, including control knobs 2, 3, 4, 5 and 6, at the above-referred to 90° right of center position No. 1 and, therefore, it is obvious that no control could be recommended to be placed at this position for pilots wearing the full-pressure suit inflated, whether with or without shoulder harness in locked condition. It is noted that no values were recorded for control knobs 7, 8 and 9 at the R90° position No. 1.

At the right-arm position Nos. 2 and 3, i.e., at 60° and 30° to the right of center, again, for the inflated full-pressure suit, no design criteria was established for either control knob 1 or 2, either with the shoulder harness being in locked or unlocked position. A design criteria did prevail for control knobs 3, 4 and 5 at these R60° and R30° positions Nos. 2 and 3. At control knob 6, no design criteria was recommended for either condition of shoulder harness for both position Nos. 2 and 3, and finally, at control knob 7 for position No. 2 only, with the shoulder harness unlocked, only two out of 17 test subjects were able to actuate said knob.

With the full-pressure suit inflated and the control knob-mounted member 33 in position No. 4 (FIG. 5), none of the 17 test subjects were able to manipulate either control knobs 1, 2 or 3, both with shoulder harness unlocked and locked. On the other hand, all or almost all 17 subjects successfully actuated control knobs 4 and 5 at the 0° center or position No. 4. However, practically none of the subjects were able to perform the requisite actuation of control knob 6 at the said position No. 4. The same condition of failure also prevailed for the right arm crossover position No. 5 for control knobs 1, 2, 3, 4, 5 and 6. Again, for control knobs 7, 8 and 9, no values were reached.

For the tests of the left arm reach capabilities of each of the 17 subjects, while in the inflated full-pressure suit, no recommendation was made and therefore no design criteria was established for controls 1-6, inclusive, while positioned in the left-arm position No. 1. In addition, for position No. 2, considerably more than two of the test subjects failed to actuate either control knobs 1 or 2, regardless of whether or not the shoulder harness was locked. A design criteria was found for control knobs 3, 4 and 5, since all 17 subjects were successful in actuating these controls. Again, however, the contrary situation existed for control knob No. 6 for the L60 or 60° to the left of center position No. 2 (See FIG. 5a), as well as the control knobs 1 and 2 for position No. 3, i.e., at 30° to the left of center. For control knobs 3, 4 and 5 in the aforesaid left arm-position No. 3, a design criteria was found for each thereof permitting, for example, a knob to be placed no further than 25, 25 and 29 inches, respectively, from the XSRP, for the unlocked harness condition, and, again, at 25, 25 and 22 inches respectively, for the locked harness condition. For the remaining control knob 6, it was recommended that no control be placed at this location. Finally, at the left arm-crossover position No. 4, none of the 17 subjects tested were able to manipulate any of the controls being investigated.

Thus, with use of the new and simplified test apparatus 10 of the present invention, the achievement of data, such as that given in the above examples, enables the aircraft cockpit-design engineer to more quickly and reliably determine the proper location of aircraft and instrument controls. In this regard, although the foregoing description has been made in specific connection with the pilot work place, the data obtainable by use of the present apparatus is equally applicable to, and useful for the layout of navigator, electronic warfare officer, and/or all work places to be occupied by a similarly encumbered aircrewman during flight.

We claim:

1. In a test apparatus for determining the arm reach capabilities of a pilot or other aircrew member to actuate various instrument and aircraft controls; an aircraft cockpit-type seat for supporting in strapped and harnessed relation therewithin each of a plurality of test subjects selected from a representative group of standard aircrew sizes; main support means comprising a base member-deck plate portion representing the aircraft cockpit-floor, a substantially upright frame support means portion supported on, and by said deck plate portion and mounting said seat at a predetermined height above the deck plate, and an overhead support means portion extending horizontally and in overlapping relation over and forwardly of, the seated test subject; and vertically disposed, rotary control knob-mounted means slidably mounted at its upper end portion to said overhead support means portion and extending in depending relation therefrom to a position in, and forwardly of, the frontal plane of the test subject, said knob-mounted means being further adjustable to various angular positions in the said frontal plane to the right and left of the center line or 0° position.

2. In a test apparatus as in claim 1, said aircraft cockpit-seat having adjustment means interconnected therewith for thereby positioning said seat at a predetermined height above the deck plate portion corresponding to a standard eye-height level above said deck plate portion for the specific subject under test.

3. In a test apparatus as in claim 2, and an eye-height-adjustment lever fixed at the standard eye-height level and operably associated with said main support means for movement between an inoperative position and an operative, eye-height-measuring position adjacent to the seated test subject.

4. In a test apparatus as in claim 1, wherein said overhead support means portion comprises a first, indirect, knob-mounted means-support member affixed to said substantially upright frame support means portion, and a second, direct, knob-mounted means-support member adjustably positioned to said first-named, support member and further being directly interconnected with one end of said knob-mounted means.

5. In a test apparatus as in claim 4, wherein said overhead support means portion further comprises a rotatably mounted element directly supported to said first support member and interconnected with, and adjustably supporting said second support member in fixed relation thereto.

6. In a test apparatus as in claim 5, wherein said rotatably mounted element comprises a turn-table supported on the top surface of said first support member, and adjustable in relative rotation to preselected positions thereon to thereby adjust the said knob-mounted means supported thereby to various angular positions.

7. In a test apparatus as in claim 6, wherein said vertically disposed and knob-mounted means comprises a first, relatively elongated, knob-mounted member supported by said second support member of said overhead support means portion, and having a plurality of rotary control knobs vertically disposed thereon at successively higher and predetermined heights above the deck plate portion.

8. In a test apparatus as in claim 7, wherein said knob-mounted means further comprises a second, auxiliary and relatively short, depending knob-mounted member slidably mounted to the first support member of said overhead support means portion at a location substantially directly over the seated test subject to thereby provide for the testing of the arm reach capabilities regarding control knobs positioned substantially directly overhead in the aircraft-cockpit.

9. In a test apparatus as in claim 8, said relatively short, knob-mounted member incorporating at least one rotary control knob adapted to be adjustably mounted in a plurality of vertically oriented and preselected positions varying in height above the deck plate portion.

* * * * *